US012030720B2

(12) United States Patent
Yoshida et al.

(10) Patent No.: US 12,030,720 B2
(45) Date of Patent: Jul. 9, 2024

(54) WAREHOUSE FACILITY

(71) Applicant: Daifuku Co., Ltd., Osaka (JP)

(72) Inventors: Masaru Yoshida, Tokyo (JP); Tooru Arii, Tokyo (JP); Tooru Siraisi, Tokyo (JP); Noritaka Arai, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 715 days.

(21) Appl. No.: 17/314,419

(22) Filed: May 7, 2021

(65) Prior Publication Data
US 2021/0395013 A1 Dec. 23, 2021

(30) Foreign Application Priority Data

Jun. 18, 2020 (JP) ................................. 2020-105085

(51) Int. Cl.
*B65G 1/137* (2006.01)
*G05B 19/418* (2006.01)
*G06Q 10/08* (2024.01)
*G06Q 10/087* (2023.01)

(52) U.S. Cl.
CPC ......... *B65G 1/1373* (2013.01); *B65G 1/1371* (2013.01); *G05B 19/41815* (2013.01); *G05B 19/4183* (2013.01); *G05B 19/41835* (2013.01); *G06Q 10/08* (2013.01); *G06Q 10/087* (2013.01)

(58) Field of Classification Search
CPC .. B65G 1/1378; B65G 1/1373; B65G 1/1371; B65G 1/137; G06Q 10/06; G06Q 10/087; G06Q 10/08

See application file for complete search history.

(56) References Cited

U.S. PATENT DOCUMENTS

| 7,894,932 | B2 * | 2/2011 | Mountz ................ | G06Q 10/087 700/214 |
| 10,464,106 | B1 * | 11/2019 | Mo ....................... | B65G 1/1373 |
| 2013/0253697 | A1 * | 9/2013 | Issing .................. | G06Q 10/087 700/214 |
| 2016/0355339 | A1 * | 12/2016 | Peng .................... | B65G 1/1378 |
| 2018/0305123 | A1 * | 10/2018 | Lert, Jr. .............. | G06Q 10/087 |

FOREIGN PATENT DOCUMENTS

| JP | 4116001 A | 4/1992 |
| JP | 201816434 A | 2/2018 |

* cited by examiner

*Primary Examiner* — Timothy R Waggoner
(74) *Attorney, Agent, or Firm* — The Webb Law Firm

(57) ABSTRACT

A warehouse facility for transporting and storing transporting tools for placing articles thereon or putting articles therein when the articles are transported is disclosed in which the transporting tools handled by a plurality of users can be appropriately managed. If an unloading request is made from a target block management unit Mb, a comprehensive management unit Mt gives a storage area management unit Ms an unloading transport instruction to perform unloading transport for a transporting tool P for which the unloading request has been made, under an unloading permission condition that the relationship between a tool code Cp designated in the unloading request and a user code Ch of a target user H1, H2 is stored in usage-related information Ih.

6 Claims, 9 Drawing Sheets

WAREHOUSE FACILITY

CROSS-REFERENCE TO RELATED APPLICATION

This application claims priority to Japanese Patent Application No. 2020-105085 filed Jun. 18, 2020, the disclosure of which is hereby incorporated by reference in its entirety.

BACKGROUND OF THE INVENTION

1. Field of the Invention

The present invention relates to a warehouse facility that includes a storage area that includes a plurality of storing sections, and a work area in which a loading operation and an unloading operation for the storage area are performed.

2. Description of the Related Art

For example, JP H04-116001A (Patent Document 1) discloses a warehouse facility that includes a storage area in which an automated warehouse (3) is installed and articles are stored, and a work area in which a work station (4) is installed and operations to load and unload articles into and from the storage area are performed. In recent years, proposals have been made to share such a warehouse facility between a plurality of users (e.g., business owners). Specifically, proposals have been made to divide the work area into a plurality of areas for different users, and store and manage articles of a plurality of users over the entire warehouse facility (the signs in brackets above are referenced in Patent Document 1).

Also, for example, in a facility disclosed in JP 2018-016434A (Patent Document 2), an article (G) is transported and stored in a state of being placed on a pallet (P) (the signs in brackets above are referenced in Patent Document 2).

SUMMARY OF THE INVENTION

It is conceivable that a facility for transporting and storing an article using a transporting tool such as a pallet for placing the article thereon or a container for putting the article therein is shared by a plurality of users. In this case, however, a plurality of transporting tools used in the facility are shared by the plurality of users and need to be appropriately managed. Moreover, the storage area is also shared by the plurality of users, and in this case, articles in the storage area also need to be appropriately managed such that an article handled by another user is incorrectly unloaded from the storage area.

In view of the foregoing situation, there is desire to realize a warehouse facility for transporting and storing the transporting tools for placing articles thereon or putting articles therein when the articles are transported, in which the transporting tools handled by the plurality of users can be appropriately managed.

A warehouse facility according to the present disclosure includes:
- a storage area including a plurality of storage sections for storing a transporting tool for placing an article thereon or putting an article therein when the article is transported;
- a work area including a plurality of work blocks to each of which a user is allocated, in which a loading operation and an unloading operation for the transporting tool allocated to each user from and to the storage area are performed;
- a storage area management unit for managing the storage area;
- a work block management unit for managing an operational state including a state of the loading operation and the unloading operation, in each of the plurality of work blocks; and
- a comprehensive management unit for managing a tool code that is set for each of a plurality of the transporting tools and a user code that is set for each of a plurality of the users, and managing usage-related information that is obtained by storing a relationship between the tool code of each of the plurality of transporting tools stored in the storage area and the user code of the user to which each of the transporting tools is allocated, the storage area is provided with a transport device for performing loading transport to transport the transporting tool to the storage sections, and unloading transport to transport the transporting tool from the storage sections, the storage area management unit causes the transport device to perform the loading transport or the unloading transport based on an instruction from the comprehensive management unit, assuming that a target work block of the plurality of work blocks is a target block, a user who uses the target block is a target user, and the work block management unit that manages the operational state in the target block is a target block management unit, the target block management unit designates the tool code and makes an unloading request to unload the transporting tool from the storage area to the comprehensive management unit, and if the unloading request is made from the target block management unit, the comprehensive management unit gives the storage area management unit an unloading transport instruction to perform the unloading transport for the transporting tool for which the unloading request has been made, under an unloading permission condition that a relationship between the tool code designated in the unloading request and the user code of the target user is stored in the usage-related information.

According to this configuration, the tool code is set for each of the plurality of transporting tools, and the user code is set for each of the plurality of users. A transporting tool to be used by the user is allocated to each of the plurality of users. The comprehensive management unit manages the usage-related information that is obtained by storing the relationship between the tool code of each of the plurality of transporting tools stored in the storage area and the user code of the user to which each transporting tool is allocated. Thus, the users to which the transporting tools stored in the storage area are allocated can be appropriately managed. To unload a transporting tool in accordance with the unloading request for the transporting tool from the target block management unit, unloading permission given by the comprehensive management unit is required. If the unloading request for a transporting tool is made from the target block management unit, the comprehensive management unit permits the unloading of the transporting tool under the unloading permission condition that the relationship between the tool code designated in the unloading request and the user code of the user pertaining to the target block management unit is stored in the usage-related information. It is thus possible to reduce the likelihood that the user who makes the unloading request for the transporting tool incorrectly unloads a transporting tool allocated to another user. Accordingly, according to this configuration, in the warehouse facility for transporting and storing the transporting tools for placing articles thereon or putting articles therein when the articles are transported, the transporting tools handled by the plurality of users can be appropriately managed.

Further features and advantages of the technology according to the present disclosure will become more apparent in the description of the following exemplary and non-limiting embodiments that will be described with reference to the drawings.

DETAILED DESCRIPTION OF PREFERRED EMBODIMENTS

A warehouse facility is shared by a plurality of users, such as business owners. In the warehouse facility, articles handled by the plurality of users are transported by a shared transport facility, and are stored and managed in a shared storage area. Hereinafter, an embodiment of the warehouse facility will be described with reference to the drawings. In the following description, a specific direction in a direction parallel to a floor surface (horizontal plane) of the facility is a first direction X, and a direction that intersects the first direction as viewed in the vertical direction is a second direction Y. In the present embodiment, the second direction Y is orthogonal to the first direction X as viewed in the vertical direction.

Figure 1:
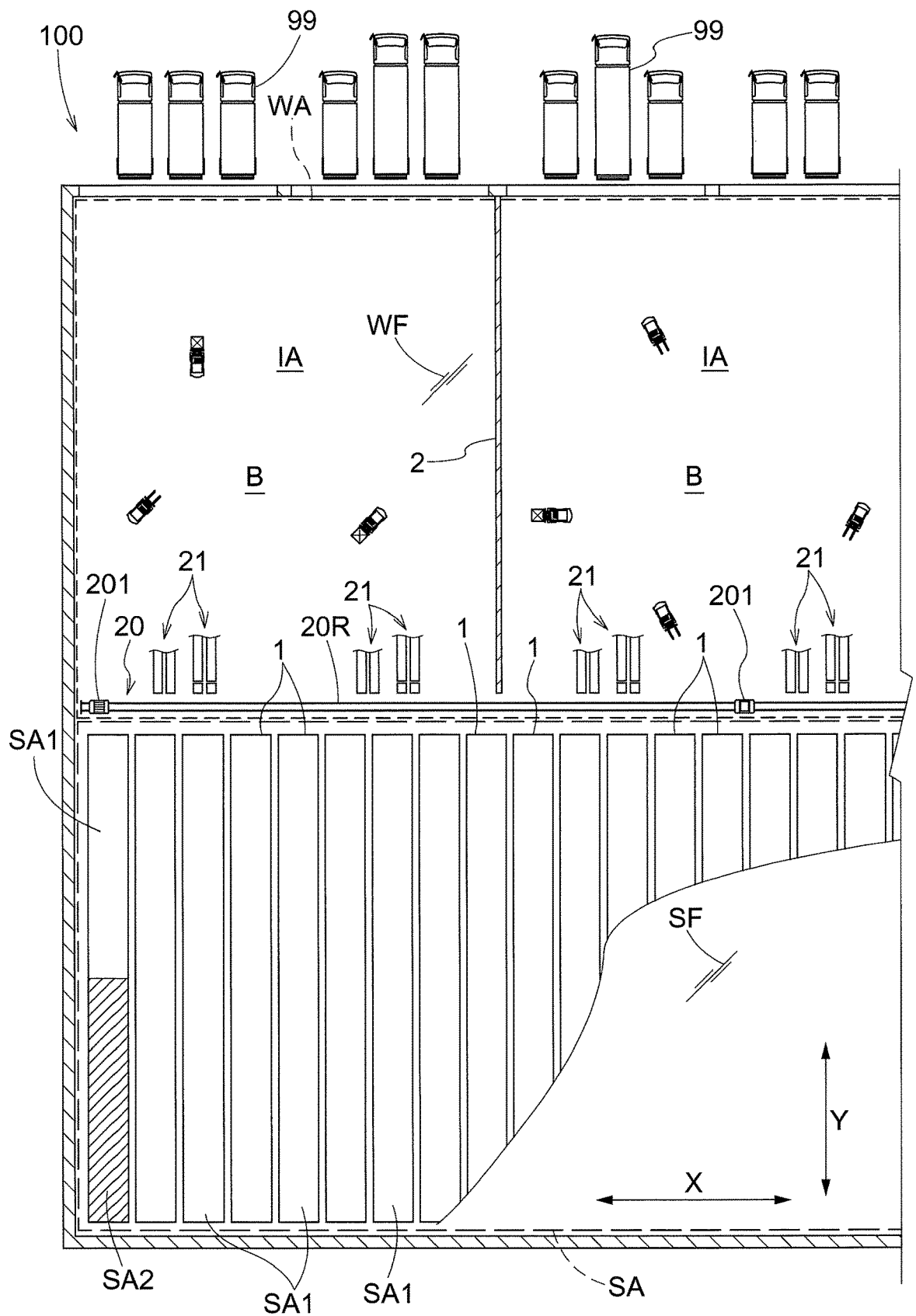
FIG. 1 is a plan view showing an entire warehouse facility.
Figure 2:
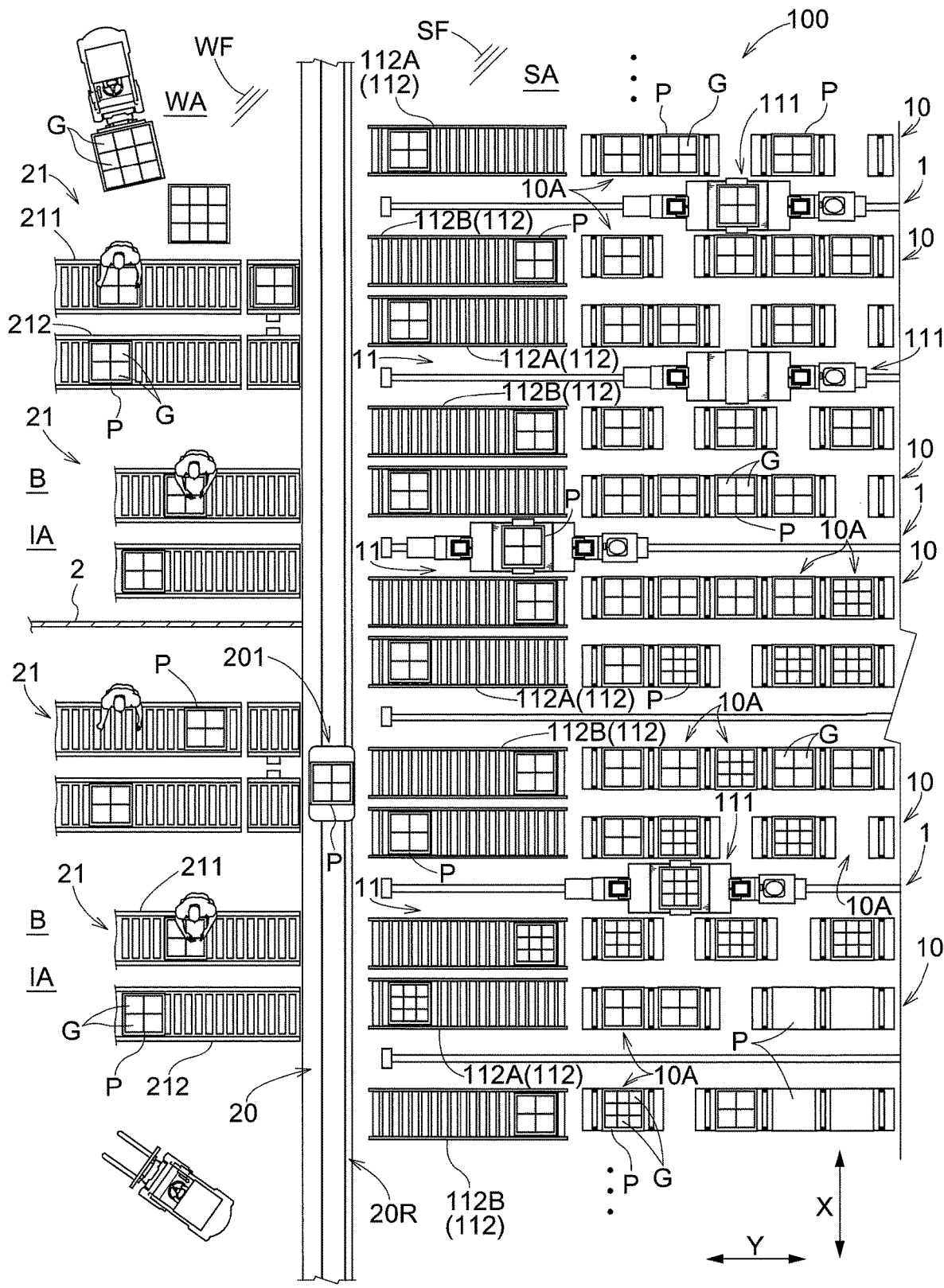
FIG. 2 is a plan view showing a part of the warehouse facility.
Figure 3:
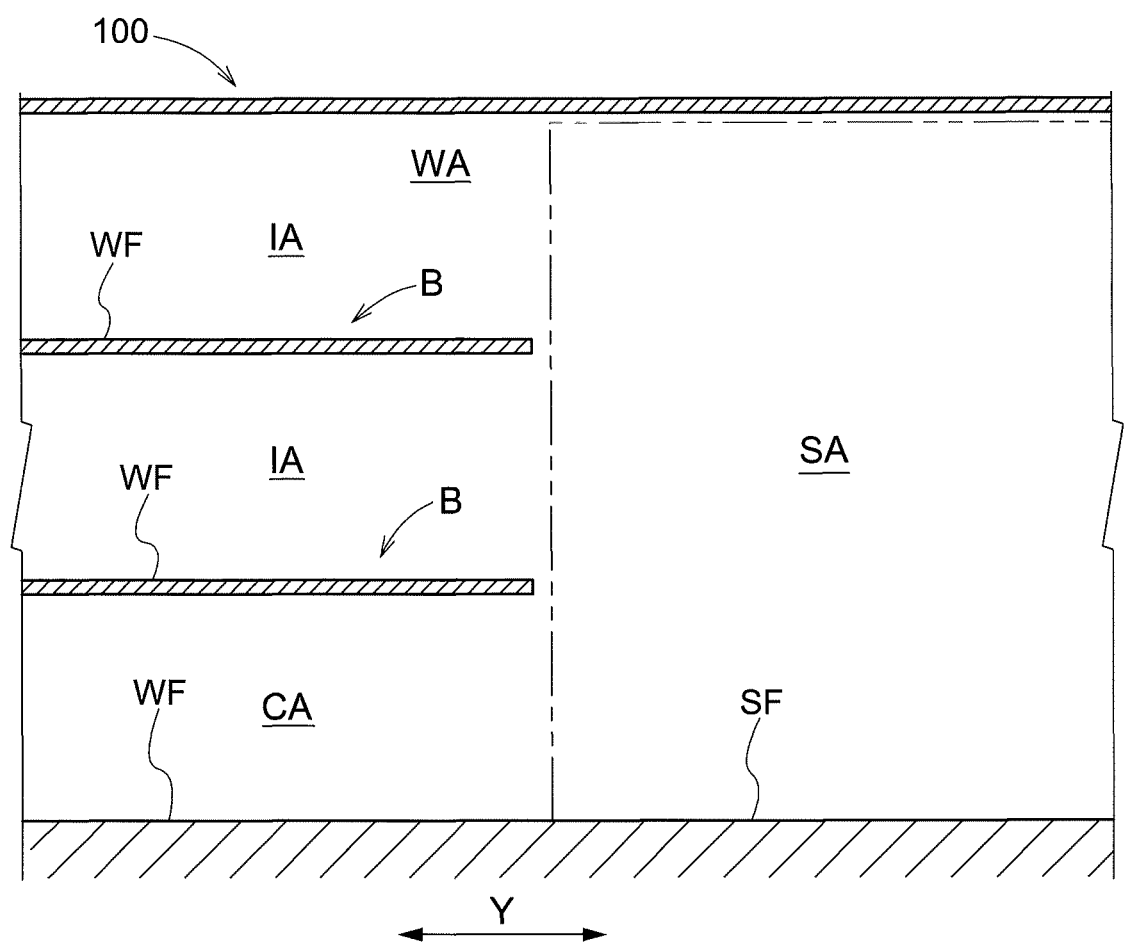
FIG. 3 is a diagram showing the division of areas in the warehouse facility as viewed in a first direction.

As shown in FIGS. 1 to 3, a warehouse facility 100 includes a storage area SA that includes a plurality of storage sections 10A for storing pallets P for placing articles G thereon when the articles G are transported, and a work area WA in which a loading operation and an unloading operation for the storage area SA for storing the pallets P, which are allocated to respective users H (see FIG. 6 etc.), are performed. The work area WA includes a plurality of work blocks B to which respective users H are allocated. In the present embodiment, a pallet P corresponds to a "transporting tool". Note that the "transporting tool" need only be a transporting tool for placing an article G thereon or putting an article G therein when the article G is transported. For example, any kind of transporting container, such as a container, a foldable container, a cage carriage, or a returnable case, may be used in place of the pallet P as the transporting tool.

In the present embodiment, the storage area SA and the work area WA are arranged adjacent to each other in the second direction Y. The storage area SA includes a storage floor SF. The work area WA includes work floors WF. In this example, the storage area SA includes one storage floor SF, and the work area WA includes a plurality of work floors WF arranged in the vertical direction, as shown in FIG. 3. In the example shown in FIG. 3, the storage floor SF is provided only on the lowermost floor of the warehouse facility 100, and the work floors WF are provided on respective floors (three floors) of the warehouse facility 100. On the first floor of the warehouse facility 100, one floor is divided by the storage floor SF and the work floor WF. Note that FIG. 3 only shows the division of the areas in the warehouse facility 100, and structures or the like provided in each area are omitted.

Storage Area

The storage area SA is an area in which the pallets P are stored. A plurality of pallets P are stored, temporarily or for a long period of time, in the storage area SA. Each pallet P is configured such that an article G is placed thereon, and is transported the article G placed thereon and stored in the storage area SA. Articles G to be placed on the pallets P include a plurality of different types of articles G. The pallets P may also be transported and stored with no article G placed thereon. The concept of the pallet P in the present specification includes an actual pallet P with an article G placed thereon, and an empty pallet P with no article G placed thereon. In the following description, when the actual pallet P and the empty pallet P are not specifically distinguished, these pallets P are simply referred to as "pallets P", which serves as the concept including these pallets P.

As mentioned above, the storage area SA includes the storage floor SF that constitutes the storage area SA. The storage area SA is a three-dimensional area that include an area overlapping the storage floor SF as viewed in the vertical direction, in addition to a planar area in which the storage floor SF is provided.

The storage area SA is provided with storage cabinets 10, each of which includes a plurality of storage sections 10A for storing the pallets P, and transport devices 11 that perform loading transport to bring the pallets P into the storage sections 10A and unloading transport to take out the pallets P from the storage sections 10A. In the present embodiment, the storage area SA includes a plurality of automated warehouse units 1 arranged in a line in the first direction X. The storage cabinets 10 and the transport device 11 are provided in each of the plurality of automated warehouse units 1. In the present embodiment, a pair of storage cabinets 10 opposing each other in the first direction X and extending in the second direction Y are provided in each of the plurality of automated warehouse units 1, as shown in FIG. 2.

Storage Section

Figure 4:
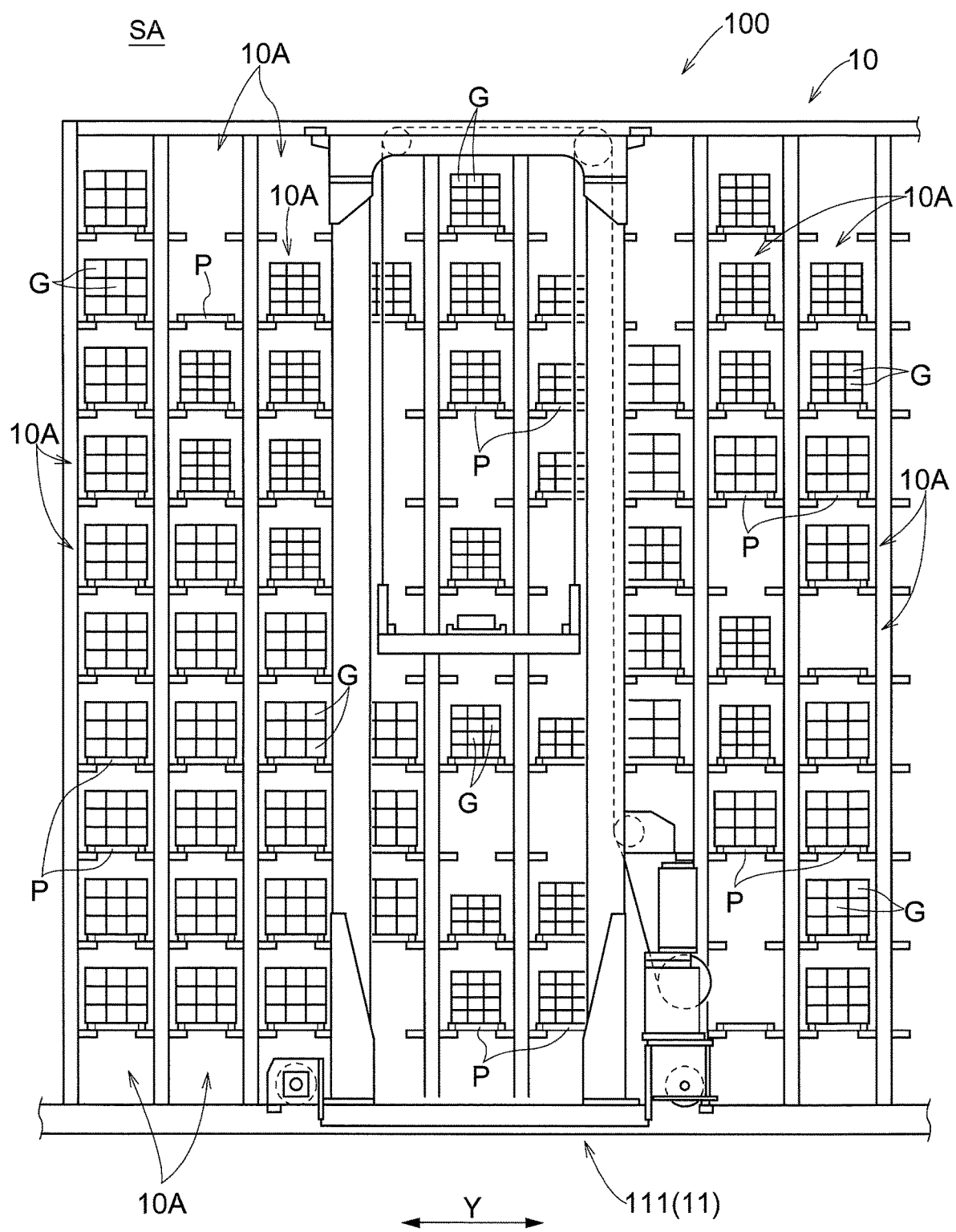
FIG. 4 is a diagram showing a part of a storage area as viewed in the first direction.

As shown in FIGS. 2 and 4, the storage sections 10A are configured to store the pallets P. In the present embodiment, a plurality of storage sections 10A are provided in each storage cabinet 10. The plurality of storage sections 10A are arranged in lines in the vertical direction and the second direction Y in the storage cabinet 10.

Transport Device

Each transport device 11 is configured to receive a pallet P from the work area WA and bring the pallet P into a storage section 10A, and to take out a pallet P from a storage section 10A and deliver the pallet P to the work area WA.

As shown in FIG. 2, in the present embodiment, each transport device 11 includes a storage transport device 111 for transferring the pallets P between the storage sections 10A, and a relay transport device 112 for transferring the pallets P to and from an inter-area transport device 20 (which will be described later).

As shown in FIG. 2, the storage transport device 111 is provided between the pair of storage cabinets 10 in the first direction X. As shown in FIG. 4, the storage transport device 111 is configured to be able to transfer the pallets P between the plurality of storage sections 10A arranged in lines in the vertical direction and the second direction Y in the storage cabinets 10. In the present embodiment, the storage transport device 111 is configured as a stacker crane capable of moving a transfer portion in the vertical direction and the second direction Y.

As shown in FIG. 2, the relay transport device 112 is provided at a position adjacent to the storage transport device 111 and the inter-area transport device 20. In the present embodiment, the relay transport device 112 includes a loading relay transport device 112A for transporting a pallet P when the pallet P is loaded into a storage section 10A, and an unloading relay transport device 112B for transporting a pallet P when the pallet P is unloaded from a storage section 10A. In the example shown in FIG. 2, the loading relay transport device 112A and the unloading relay transport device 112B are arranged separately on respective sides in the first direction X of a transport path of the storage transport device 111. The loading relay transport device 112A is configured to receive a pallet P from the inter-area transport device 20 and deliver the pallet P to the storage transport device 111. The unloading relay transport device 112B is configured to receive a pallet P from the storage transport device 111 and deliver the pallet P to the inter-area transport device 20. In this example, the loading relay transport device 112A and the unloading relay transport device 112B are configured as conveyors each of which has a conveyor surface for transporting the pallets P with the pallets P placed thereon. These conveyors may be conveyors with a known structure, such as roller conveyors, belt conveyors, or chain conveyors.

Work Area

The work area WA is an area in which various operations, such as a loading operation to load a pallet P into the storage area SA and an unloading operation to unload a pallet P from the storage area SA, are performed. Specifically, in the work area WA, an operation to place an article G, which has arrived from the outside of the facility, on a pallet P and transport this pallet P (actual pallet P) to the storage area SA is performed in order to load the article G into the storage area SA. Also, in the work area WA, an operation to receive a pallet P (actual pallet P) on which an article G is placed and forward the article G placed on this pallet P to the outside of the facility is performed in order to unload the article G from the storage area SA. In addition, an operation to sort the articles G in accordance with the forwarding destination and storage destination, operation to packing and unpacking the articles G, and so on, are performed in the work area WA. As shown in FIG. 1, the articles G are forwarded from the warehouse facility 100 to the outside of the facility, and the articles G arrive at the warehouse facility 100 from the outside of the facility, by means of an external transporting means, such as motor trucks 99.

As mentioned above, the work area WA includes the work floors WF that constitute the work area WA. The work area WA is a three-dimensional area that includes areas that overlap the work floors WF as viewed in the vertical direction, in addition to planar areas in which the work floors WF are provided. In this example, a three-dimensional area including the work floors WF on a plurality of floors constitutes one work area WA.

Figure 6:
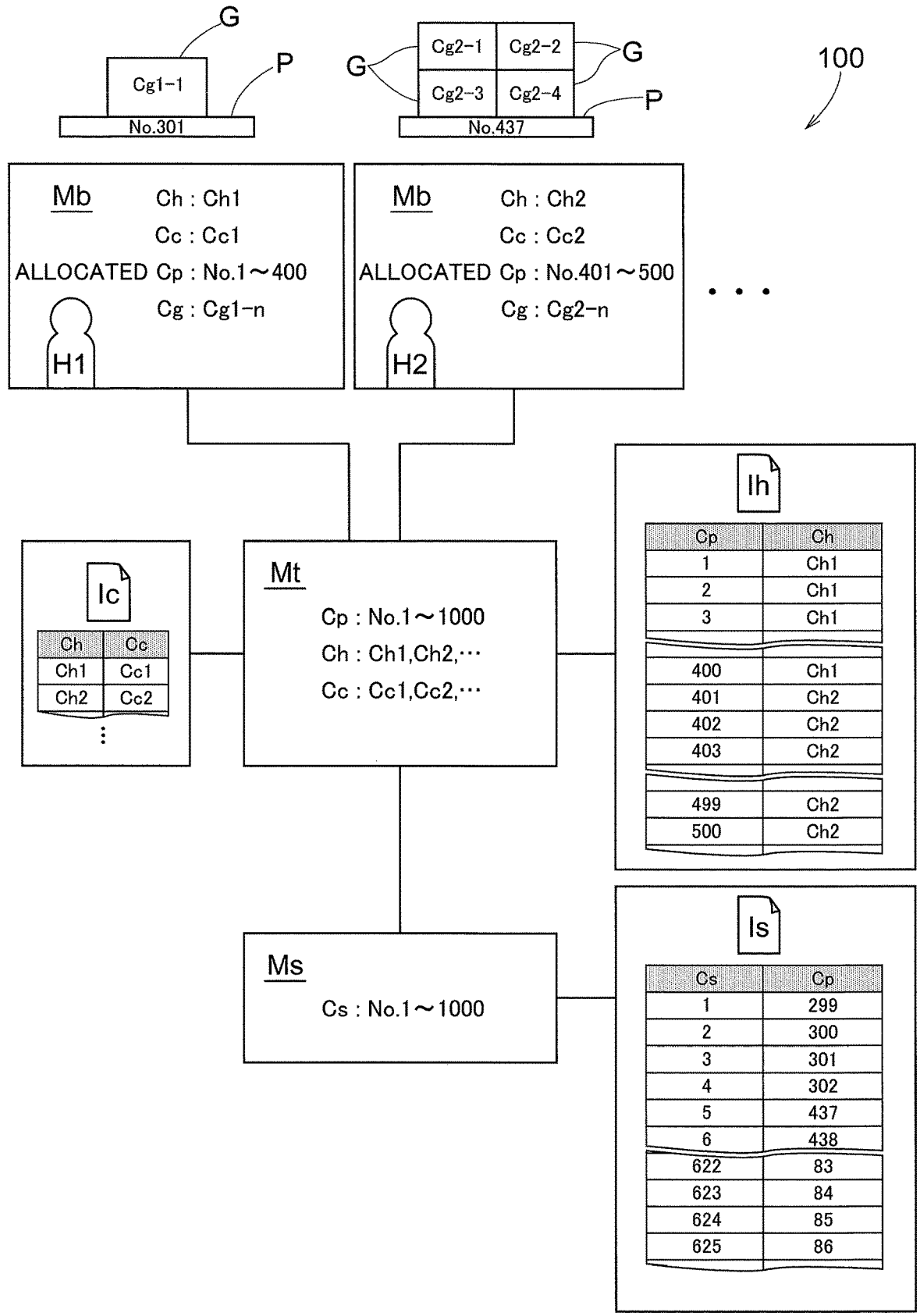
FIG. 6 is an explanatory diagram showing a system configuration of the warehouse facility.

As shown in FIG. 1, the work area WA includes a plurality of work blocks B that are allocated to respective users H (see FIG. 6 etc.). The plurality of work blocks B is partitioned in the first direction X on the same floor by a partition member 2. In the present embodiment, the plurality of work blocks B that are partitioned by the partition member 2 are provided on some of the plurality of floors that constitute the work area WA. The other floors of the plurality floors are not provided with the work blocks B. In this example, the work blocks B are provided on the floors other than the lowermost floor, and the work blocks B are not provided on the lowermost floor, as shown in FIG. 3.

As shown in FIG. 3, the warehouse facility 100 according to the present embodiment includes individual reception areas IA, which are areas used by respective users H and in which articles G that are handled by the respective users H and arrive from the outside of the facility are received, and a shared reception area CA that is shared by the plurality of users H and in which articles G that are handled by the respective users H and arrive from the outside of the facility are received. Arrival reception includes an operation to place the article G on a pallet P. If a container is used in place of a pallet P as the transporting tool, arrival reception includes an operation to put the article G into the container. The individual reception areas IA are provided on respective work blocks B. In the example shown in FIG. 3, the individual reception areas IA are provided on the floors other than the lowermost floor. The shared reception area CA is provided on the lowermost floor. Thus, in the present embodiment, the shared reception area CA is provided at a location different from the individual reception areas IA in which articles G arriving from the outside of the facility are received in the respective work blocks B.

Inter-area Transport Device and Loading/Unloading Sections

As shown in FIGS. 1 and 2, the work area WA is provided with the inter-area transport device 20 for transporting the pallets P between the work area WA and the storage area SA, and loading/unloading sections 21 that are arranged in each of the plurality of work blocks B and in which the pallets P are received from, and delivered to, the inter-area transport device 20 when the pallets P are loaded/unloaded.

The inter-area transport device 20 is provided between the loading/unloading sections 21 and the relay transport devices 112 in the storage area SA in the second direction Y. The inter-area transport device 20 is configured to receive and deliver the pallets P between the loading/unloading sections 21 and the relay transport devices 112, and is also configured to transport the pallets P in the first direction X in a state of holding the pallets P. The inter-area transport device 20, which can transport the pallets P in the first direction X, is configured to be able to receive and deliver the pallets P between a plurality of loading/unloading sections 21 and a plurality of relay transport devices 112 that are arranged in the first direction X.

In the present embodiment, the inter-area transport device 20 includes traveling trucks 201 that travel on a traveling rail 20R, which is arranged in the first direction X. The traveling trucks 201 are configured to be able to travel on the traveling rail 20R and transport the pallets P in the first direction X. Each traveling truck 201 includes a transfer mechanism for moving the pallets P in the second direction Y, and receives and delivers, using this transfer mechanism, the pallets P from and to the loading/unloading sections 21 and the relay transport devices 112 that are arranged on the respective sides in the second direction Y of the traveling truck 201. In this example, the inter-area transport device 20 includes a plurality of traveling trucks 201 (see FIG. 1). The plurality of traveling trucks 201 travel on the same traveling rail 20R. Note that, although the details are not shown in the drawings, the inter-area transport device 20 is provided on each of the plurality of floors in the work area WA.

As shown in FIG. 2, the loading/unloading sections 21 are configured to receive and deliver the pallets P from and to the inter-area transport device 20. In the present embodiment, each loading/unloading section 21 includes a loading conveyor 211 for delivering a pallet P to the inter-area transport device 20 when the pallet P is loaded, and an unloading conveyor 212 for receiving a pallet P from the inter area transport device 20 when the pallet P is unloaded. At least one pair of the loading conveyor 211 and the unloading conveyor 212 is provided in each of the plurality of work blocks B. In the example shown in FIG. 2, two pairs of the loading conveyor 211 and the unloading conveyor 212 are provided in each of the plurality of work blocks B.

System Configuration of Warehouse Facility

Next, a system configuration of the warehouse facility 100 will be described. In the warehouse facility 100, a work block B is allocated to each of the plurality of users H. Each user H performs loading and unloading operations to load and unload the pallets P for placing articles G handled by the user H thereon in the allocated work block B. Meanwhile, the storage area SA is shared by the plurality of users H. The pallets P for placing articles G handled by the respective users H thereon are stored in the storage area SA. The warehouse facility 100 according to the present disclosure is configured to be able to appropriately manage the pallets P for placing articles G handled by the respective users H thereon. A detailed description will be given below.

As shown in FIG. 6, in the warehouse facility 100, a pallet code Cp is set for each of the plurality of pallets P. A user code Ch and an authentication code Cc are set for each of the plurality of uses H. A storage section code Cs is set for each of the plurality of storage sections 10A provided in the storage cabinets 10. An article code Cg is set for each article G. In the example shown in FIG. 6, reference signs H1 and H2 are used to distinguish between the plurality of users H. A user code Ch1 and an authentication code Cc1 are set for a user H1. A user code Ch2 and an authentication code Cc2 are set for a user H2. In the example shown in FIG. 6, the numbers No. 1 to 1000 are set as the pallet codes Cp, and the numbers No. 1 to 1000 are set as the storage section codes Cs. Letters, numbers, symbols, and so on that indicate these codes are merely examples. Each of the codes can be set in any manner. In the present embodiment, each pallet code Cp corresponds to a "tool code". The article code Cg is a code uniquely set for each article G and does not need to be a code classified for each user H. However, in this example, an article code Cg1-$n$ ($n$ is a natural number) is given to each article G handled by the user H1, and an article code Cg2-$n$ ($n$ is a natural number) is given to each article G handled by the user H2, for convenience of description.

The warehouse facility 100 includes a storage area management unit Ms for managing the storage area Sa, a work block management unit Mb for managing the operational state including the state of the loading operation and the unloading operation in each of the plurality of work blocks B, and a comprehensive management unit Mt.

The comprehensive management unit Mt allocates the pallet codes Cp of the plurality of pallets P provided in the warehouse facility 100 to each of the plurality of users H. In the example shown in FIG. 6, of the pallet codes No. 1 to 1000 managed by the comprehensive management unit Mt, the pallet codes Cp of No. 1 to 400 are allocated to the user H1. The user H1 uses 400 pallets P with the pallet codes Cp of No. 1 to 400 in order to place articles G handled by the user H1 thereon. FIG. 6 shows an example in which the user H1 places an article G with an article code Cg1-1 on a pallet P with a pallet code No. 301.

Of the pallet codes No. 1 to 1000 managed by the comprehensive management unit Mt, the pallet codes Cp of No. 401 to 500 are allocated to the user H2. The user H2 uses 100 pallets P with the pallet codes Cp of No. 401 to 500 in order to place articles G handled by the user H2 thereon. FIG. 6 shows an example in which the user H2 places a plurality of articles G with the article codes Cg2-1, Cg2-2, Cg2-3, and Cg2-4 on a pallet P with the pallet code No. 437. A plurality of articles G may be thus placed on one pallet P.

Here, of the plurality of pallets P provided in the warehouse facility 100, a pallet P that is allocated to any one of the plurality of users H is referred to as an allocated pallet Pf, and a pallet P that is not allocated to any one of the plurality of users H is referred to as an unallocated pallet Py. The pallet codes Cp are set for both the allocated pallet Pf and the unallocated pallet Py. In the present embodiment, the allocated pallet Pf corresponds to an "allocated tool", and the unallocated pallet Py corresponds to an "unallocated tool". Although the present specification may describe the allocated pallet Pf and the unallocated pallet Py, as well as a pallet to be loaded Pt and a loaded pallet Pa, which will be described later, using different signs, in this diagram, these pallets are assigned a reference sign "P", which collectively indicate these pallets.

The comprehensive management unit Mt manages the pallet code Cp that is set for each of the plurality of pallets P and the user code Ch that is set for each of the plurality of users H, and also manages usage-related information Ih that is obtained by storing the relationship between the pallet code Cp of each of the plurality of pallets P stored in the storage area SA and the user code Ch of the user H to which each pallet P is allocated. Thus, the user H to which each of the pallets P (loaded pallets Pa) stored in the storage area SA is allocated can be appropriately managed.

In the example shown in FIG. 6, the relationship in which the pallet codes No. 1 to 400 are allocated to the user H1 with the user code Ch1 is stored in the usage-related information Ih. Also, the relationship in which the pallet codes No. 401 to 500 are allocated to the user H2 with the user code Ch2 is stored in the usage-related information Ih. That is to say, the comprehensive management unit Mt can perceive, based on the usage-related information Ih, that 400 allocated pallets Pf with the pallet codes No. 1 to 400 pertain to the user H1, and 100 allocated pallets Pf with the pallet codes No. 401 to 500 pertain to the user H2.

In the present embodiment, the comprehensive management unit Mt manages the authentication code Cc that is set for each of the plurality of users H in addition to the pallet code Cp and the user code Ch, and also manages authentication-related information Ic that is obtained by storing the relationship between the user codes Ch of the plurality of users H and the authentication code Cc of each user H. In the example shown in FIG. 6, the relationship in which the authentication code Cc1 is set for the user H1 with the user code Ch1 is stored in the authentication-related information Ic. The relationship in which the authentication code Cc2 is set for the user H2 with the user code Ch2 is stored in the authentication-related information Ic. That is to say, the comprehensive management unit Mt can perceive that the user H1 has the authentication code Cc1, and that the user H2 has the authentication code Cc2.

Figure 5:
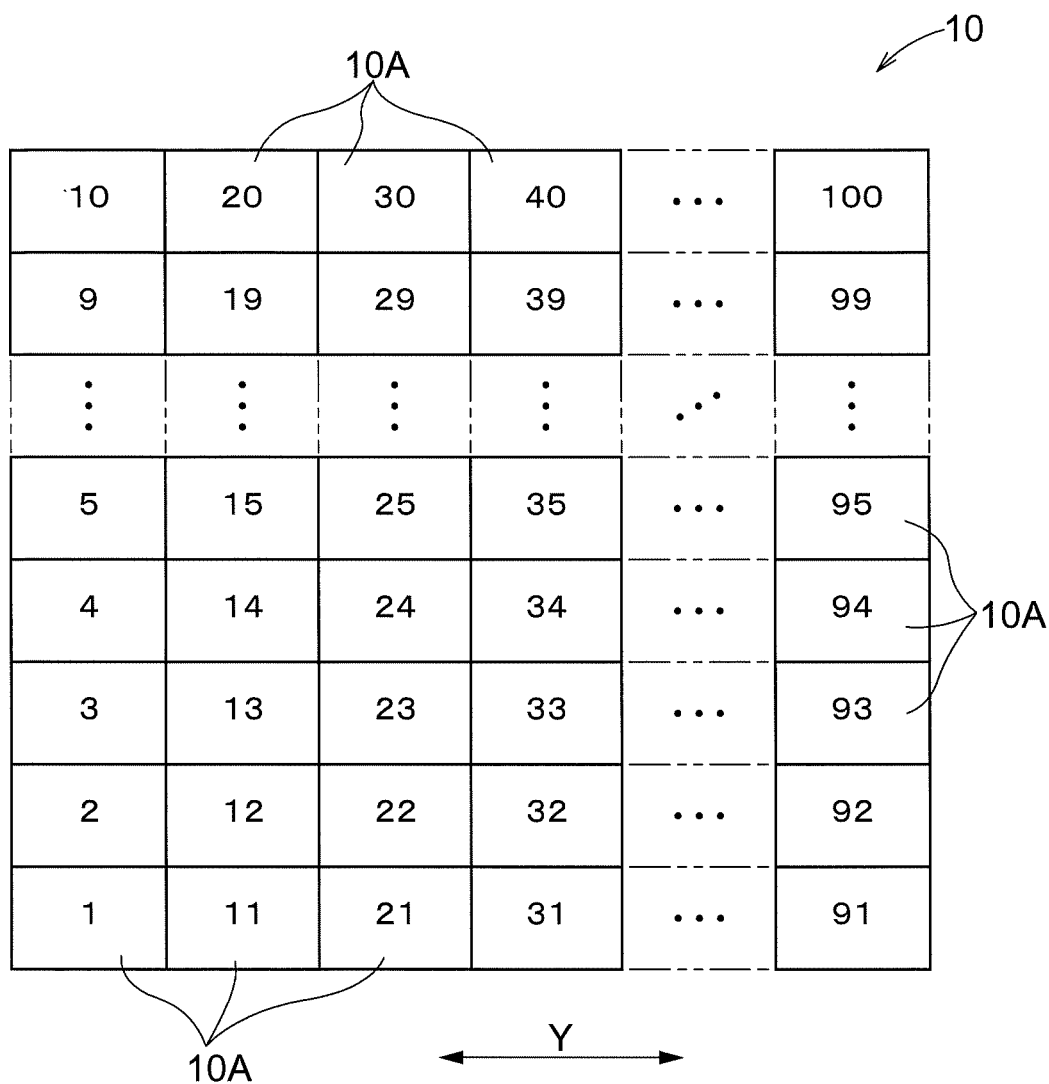
FIG. 5 is an explanatory diagram of storage section codes.

The storage area management unit Ms manages the storage section code Cs that is set for each of the plurality of storage sections 10A, and also manages storage-related information Is that is obtained by storing the relationship between the pallet codes Cp of the pallets P and the storage section codes Cs of the storage sections 10A in which these pallets P are stored. For example, FIG. 5 schematically shows the plurality of storage sections 10A arranged in lines in the vertical direction and the second direction Yin one storage cabinet 10. The storage section code Cs is set for each of the plurality of storage sections 10A. In the example shown in FIG. 5, a total of 100 storage sections 10A are arranged in one storage cabinet 10, and the numbers No. 1 to 100 are set as the storage section codes Cs of the respective storage sections 10A. In the example shown in FIG. 6, the relationship in which, for example, a pallet P (allocated pallet Pf) with the pallet code No. 299 is stored in a storage section 10A with the storage section code No. 1, of the plurality of storage sections 10A with the storage section codes No. 1 to 1000, is stored in the storage-related information Is. That is to say, the storage area management unit Ms can perceive the pallet code Cp of the allocated pallet Pf stored in each of the plurality of storage sections 10A.

As shown in FIG. 1, in the present embodiment, the storage area SA includes main storage regions SA1 for storing the allocated pallets Pf and a sub-storage region SA2 for storing the unallocated pallets Py. In the example shown in FIG. 1, a hatched region in the storage area SA is the sub-storage region SA2, and the remaining regions are the main storage regions SA1. Since the unallocated pallets Py are not allocated to any user H, articles G of any user H are not placed on these pallets. For this reason, in this example, in the sub-storage region SA2 for storing the unallocated pallets Py, a plurality of unallocated pallets Py are stacked to collectively store the plurality of unallocated pallets Py in one storage section 10A. Thus, the storage area SA can be effectively used. Although the details are not shown in the diagrams, in the present embodiment, the storage area management unit Ms manages the storage-related information Is that is obtained by storing the relationship between the pallet codes Cp of the unallocated pallets Py and the storage section code Cs of the storage sections 10A in which these unallocated pallets Py are stored. That is to say, the storage area management unit Ms can perceive the pallet codes Cp of the unallocated pallets Py stored in the storage sections 10A.

The storage area management unit Ms controls the transport devices 11 (see FIG. 2) provided in the storage area SA. The storage area management unit Ms causes each transport device 11 to perform loading transport or unloading transport based on an instruction from the comprehensive management unit Mt. Specifically, if a loading transport instruction is given from the comprehensive management unit Mt, the storage area management unit Ms causes the transport device 11 to perform loading transport to load a pallet P pertaining to the loading transport instruction. If an unloading transport instruction is given from the comprehensive management unit Mt, the storage area management unit Ms causes the transport device 11 to perform unloading transport to unload a pallet P pertaining to the unloading transport instruction.

Each of the plurality of work block management units Mb manages a corresponding work block B. Each of the plurality of work block management units Mb manages the user code Ch of a corresponding user H, the authentication code Cc that is set for this user H, and the pallet codes Cp of allocated pallets Pf that are allocated to this user H. Furthermore, in the present embodiment, each of the work block management units Mb also manages the article code Cg of an article G placed on each of the allocated pallets Pf that are allocated to the user H. Thus, each work block management unit Mb can perceive the article G placed on each pallet P.

Here, to give description focusing on one of the plurality of work block management units Mb, a target work block B of the plurality of work blocks B is referred to as a target block B, the user H who uses the target block B is referred to as a target user H, and the work block management unit Mb that manages the operational state in the target block B is referred to as a target block management unit Mb. This definition is for convenience of description. Accordingly, the target block B is synonymous with the work block B, the target user H is synonymous with the user H, and the target block management unit Mb is synonymous with the work block management unit Mb. In the present specification, the same reference signs are used for these corresponding terms.

The target block management unit Mb makes a loading request to load a pallet P into the storage area SA while designating the pallet code Cp to the comprehensive management unit Mt. In the present embodiment, when making the loading request, the target block management unit Mb further outputs the user code Ch that is set for this target block management unit Mb to the comprehensive management unit Mt. Also, the target block management unit Mb makes an unloading request to unload a pallet P from the storage area SA while designating the pallet code Cp to the comprehensive management unit Mt. In the present embodiment, when making the unloading request, the target block management unit Mb further outputs the user code Ch that is set for this target block management unit Mb to the comprehensive management unit Mt.

More specifically, when making the loading request, the target block management unit Mb designates the pallet code Cp of the pallet to be loaded Pt subjected to the loading request, of the plurality of allocated pallets Pf pertaining to the pallet codes Cp allocated to this target block management unit Mb. When making the unloading request, the target block management unit Mb designates the pallet code Cp of the loaded pallet Pa (pallet to be unloaded) that has already been loaded into the storage section 10A and is subjected to the unloading request, of the plurality of allocated pallets Pf pertaining to the pallet codes Cp allocated to this target block management unit Mb. Note that, in the present embodiment, the pallet to be loaded Pt corresponds to a "tool to be loaded", and the loaded pallet Pa corresponds to a "loaded tool".

If the loading request is made from the target block management unit Mb, the comprehensive management unit Mt gives the storage area SA a loading transport instruction to perform loading transport for the pallet P for which the loading request has been made, under a loading permission condition that the pallet code Cp that is set for the pallet P (pallet to be loaded Pt) pertaining to the loading request is given from the target block management unit Mb. Also, in the present embodiment, the comprehensive management unit Mt references the usage-related information Ih, and also regards, as the loading permission condition, the pallet code Cp designated in the loading request belonging to the user code Ch of the user H who has made the loading request.

When the unloading request is made from the target block management unit Mb, the comprehensive management unit Mt gives the storage area management unit Ms an unloading transport instruction to perform unloading transport for the pallet P for which the unloading request has been made, under an unloading permission condition that the relationship between the pallet code Cp designated in the unloading request and the user code Ch of the user H is stored in the usage-related information Ih. In other words, the comprehensive management unit Mt references the usage-related information Ih, and gives the unloading transport instruction if it is determined that the pallet code Cp designated in the unloading request belongs to the user code Ch of the user H who has made the unloading request. Thus, it is possible to reduce the likelihood that the user H who makes the unloading request for a pallet P incorrectly unloads a pallet P that is allocated to another user H.

In the present embodiment, the target block management unit Mb designates, in the unloading request, the pallet code Cp of the pallet P subjected to the unloading request, and also outputs the authentication code Cc that is set for the user H to the comprehensive management unit Mt. Then, when the unloading request is made from the target block management unit Mb, the comprehensive management unit Mt also regards, as the unloading permission condition, the relationship between the authentication code Cc output from the target block management unit Mb and the user code Ch of the user H being stored in the authentication-related information Ic. In other words, the comprehensive management unit Mt references the authentication-related information Ic, and if it is determined that the authentication code Cc output from the target block management unit Mb that has made the unloading request is associated with the user code Ch pertaining to the target block management unit Mb, the comprehensive management unit Mt regards this determination result as the further unloading permission condition and gives the unloading transport instruction. Thus, it can be regarded as the further condition for permitting the unloading that the authentication code Cc output by the target block management unit Mb that has made the unloading request is the authentication code Cc that is set for the user H pertaining to this target block management unit Mb. Accordingly, even if the user code Ch of the user H is incorrectly used by another user H, the pallet P (allocated pallet Pp that is allocated to the user H is not unloaded by the other user H unless the authentication code Cc is correct. Accordingly, it is possible to further reduce the likelihood that the user H who makes an unloading request for a pallet P incorrectly unloads a pallet P (allocated pallet Pf) that is allocated to another user H.

Figure 7:
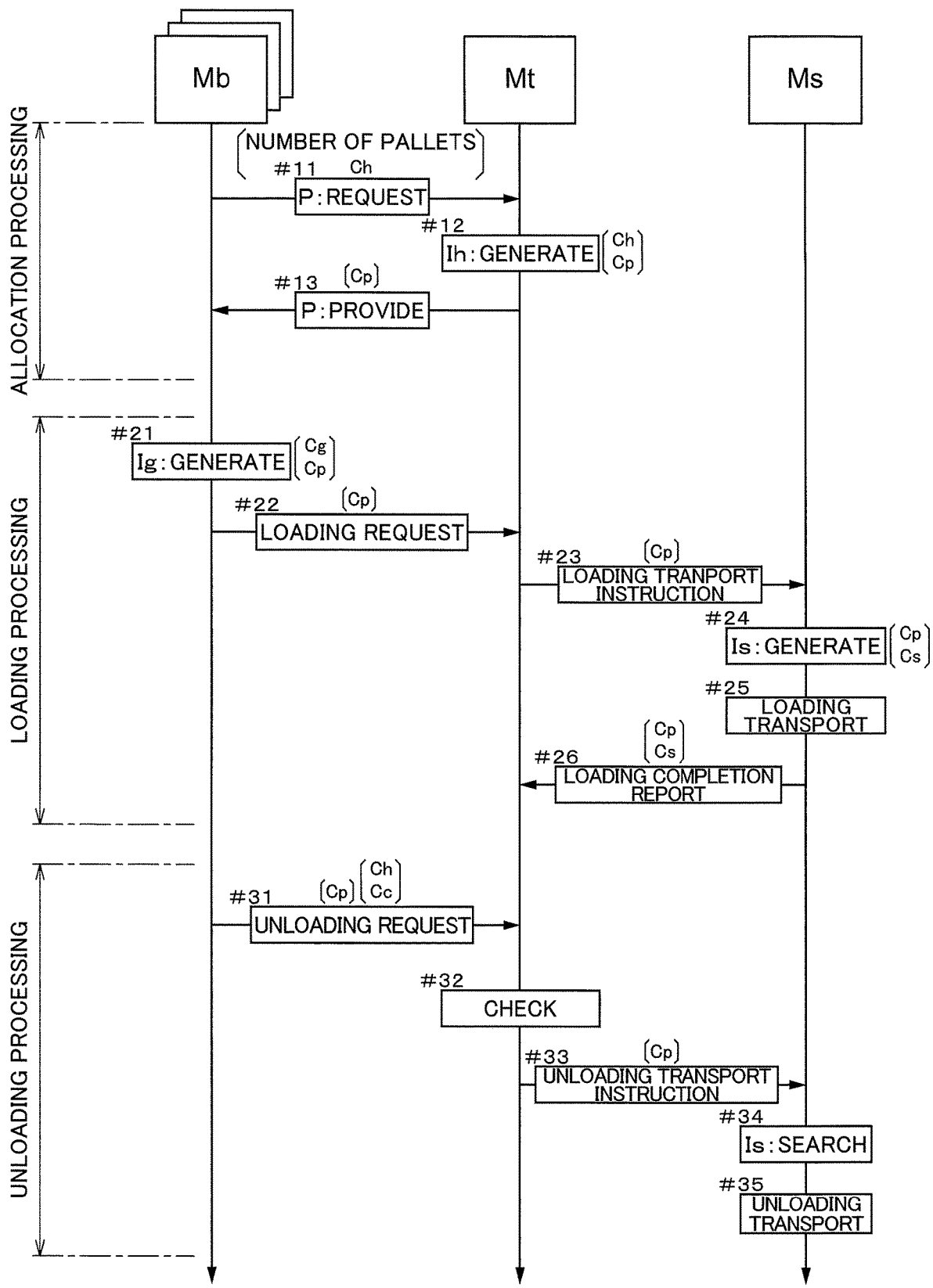
FIG. 7 is a flowchart showing a procedure for performing processing in the warehouse facility.

Next, processing performed by the warehouse facility 100 will be described with reference to the flowchart in FIG. 7.

The warehouse facility 100 is configured to execute allocation processing to allocate the pallets P to each of the plurality of users H, loading processing to load a pallet P to the storage area SA, and unloading processing to unload a pallet P from the storage area SA.

Allocation Processing

In the allocation processing, the target block management unit Mb makes a request to allocate the pallets P to the comprehensive management unit Mt (#11). When making the request to allocate the pallets P, the target block management unit Mb outputs a signal indicating a desired number of pallets and the user code Ch to the comprehensive management unit Mt. For example, in the example shown in FIG. 6, if the user H1 wants to use 400 pallets P when starting to use the warehouse facility 100 for the first time, the target block management unit Mb pertaining to the user H1 outputs a signal indicating the number of pallets, i.e., 400, and the user code Ch1 to the comprehensive management unit Mt. Note that, when the user who is already using the warehouse facility 100 newly makes a request to allocate the pallets P in addition to the already-allocated pallets P, similarly, the work block management unit Mb pertaining to this user H outputs a signal indicating the number of pallets of which the user H newly makes a request for allocation and the user code Ch1 to the comprehensive management unit Mt.

The comprehensive management unit Mt that has received the request to allocate the pallets P from the target block management unit Mb generates the usage-related information Ih that is obtained by storing the relationship between the user code Ch output by this target block management unit Mb and the pallet codes Cp to be allocated to the user H with this user code Ch (#12). For example, in the example shown in FIG. 6, the usage-related information Ih indicating that 400 pallets P with the pallet codes No. 1 to 400 belong to the user H1 with the user code Ch1 is generated.

After generating the usage-related information Ih, the comprehensive management unit Mt provides the pallets P to the target block management unit Mb that has made the request to allocate the pallets P (#13). When providing the pallets P, the comprehensive management unit Mt outputs the pallet codes Cp of the provided pallets P to the target block management unit Mb. For example, in the example shown in FIG. 6, the comprehensive management unit Mt gives the storage area management unit Ms an unloading transport instruction to unload 400 pallets P from the sub-storage region SA2 for the target block B pertaining to the user H1, and also outputs the pallet codes No. 1 to 400 that are set for 400 pallets P to the target block management unit Mb. Note that if the comprehensive management unit Mt cannot fulfill the request from the target block management unit Mb, e.g., if the number of providable unallocated pallets Py is smaller than the number of pallets requested by the target block management unit Mb, the comprehensive management unit gives an error notification to the target block management unit Mb. A configuration may also be employed in which, if a large number of pallets P is allocated at a time, the comprehensive management unit Mt unloads only some of the allocated pallets P to the target block B and temporarily store the remaining pallets P in the storage section 10A. In this case, the comprehensive management unit Mt gives the storage area management unit Ms an instruction to sequentially unload the allocated pallets Pf stored in the storage section 10A in accordance with a request from the target block management unit Mb.

Loading Processing

In the loading processing, the target block management unit Mb receives an arriving article G from the outside of the facility, and generates arrival-related information Ig that is obtained by storing the relationship between the article code Cg of the arriving article G received and the pallet code Cp of the pallet P on which this article G is placed (#21). For example, in the example shown in FIG. 6, the target block management unit Mb pertaining to the user H1 receives an arriving article G with the article code Cg1-1, and places this article G on a pallet P with the pallet code No. 301. The target block management unit Mb then generates the arrival-related information Ig indicating that the article G with the article code Cg1-1 is placed on the pallet P with the pallet code No. 301. Note that the arriving article G is received in the individual reception area IA (see FIG. 3) provided in the target block B, as mentioned above.

After generating the arrival-related information Ig, the target block management unit Mb makes a loading request to the comprehensive management unit Mt (#22). When making the loading request, the target block management unit Mb outputs the pallet code Cp of the pallet P pertaining to the loading request to the comprehensive management unit Mt. For example, in the example shown in FIG. 6, the target block management unit Mb pertaining to the user H1 outputs, to the comprehensive management unit Mt, the pallet code No. 301 of the pallet P on which the article G with the article code Cg1-1 is placed.

The comprehensive management unit Mt that has received the loading request from the target block management unit Mb gives the storage area management unit Ms a loading transport instruction to perform the loading transport for the pallet P for which the loading request has been made (#23). When giving the loading transport instruction, the comprehensive management unit Mt outputs the pallet code Cp of the pallet P pertaining to the loading request to the storage area management unit Ms. For example, in the example shown in FIG. 6, the comprehensive management unit Mt that has received a loading request for the pallet P with the pallet code No. 301 from the target block management unit Mb pertaining to the user H1 gives the storage area management unit Ms a loading transport instruction to perform loading transport for this pallet P with the pallet code No. 301.

The storage area management unit Ms that has received the loading transport instruction from the comprehensive management unit Mt generates the storage-related information Is that is obtained by storing the relationship between the pallet code Cp of the pallet P pertaining to this loading transport instruction and the storage section code Cs of the storage section 10A that is a loading destination to which the pallet P is to be loaded (#24). Then, the storage area management unit Ms manages the storage-related information Is that is obtained by storing the relationship between the pallet code Cp of the pallet P and the storage section code Cs of the storage section 10A in which this pallet P is stored. For example, in the example shown in FIG. 6, the storage area management unit Ms that has received a loading transport instruction for the pallet P with the pallet code No. 301 from the comprehensive management unit Mt generates the storage-related information Is that is obtained by storing the relationship between the pallet code No. 301 of this pallet P and the storage section code No. 3 of the storage section 10A that is the loading destination to which this pallet P is to be loaded.

The storage area management unit Ms that has generated the storage-related information Is causes the transport device 11 (see FIG. 2) to perform loading transport to transport, to the storage section 10A, the pallet P for which the loading transport instruction has been given, based on the generated storage-related information Is (#25). For example, in the example shown in FIG. 6, the storage area management unit Ms causes the transport device 11 to perform loading transport to bring pallet P (the pallet P with the pallet code No. 301) for which the loading transport instruction has been given, into the storage section 10A with the storage section code No. 3.

After completing the loading, the storage area management unit Ms makes a loading completion report to the comprehensive management unit Mt (#26). In this example, when making the loading completion report, the storage area management unit Ms outputs, to the comprehensive management unit Mt, the pallet code Cp of the loaded pallet P and the storage section code Cs of the storage section 10A to which this pallet P has been loaded. Accordingly, the comprehensive management unit Mt can perceive the storage section code Cs that the storage section 10A, to which the loaded pallet Pa is stored, has. In the example shown in FIG. 6, the storage area management unit Ms outputs, to the comprehensive management unit Mt, the pallet code No. 301 of the loaded pallet P and the storage section code No. 3 of the storage section 10A to which this pallet P has been loaded.

Unloading Processing

In the unloading processing, the target block management unit Mb designates the pallet code Cp and makes an unloading request for unloading from the storage area SA to the comprehensive management unit MT (#31). When making the unloading request, the target block management unit Mb outputs, to the comprehensive management unit Mt, the user code Ch and the authentication code Cc pertaining to the user H, in addition to the pallet code Cp of the pallet P pertaining to the unloading request. For example, in the example shown in FIG. 6, the target block management unit Mb pertaining to the user H1 outputs, to the comprehensive management unit Mt, the pallet code No. 299 of the pallet P pertaining to the unloading request, the user code Ch1, and the authentication code Cc1.

If the unloading request is made from the target block management unit Mb, the comprehensive management unit Mt references the usage-related information Ih and checks the pallet code Cp of the pallet P pertaining to the unloading request against the user code Ch of the user H to which this pallet code Cp is allocated (#32). If the relationship between this pallet code Cp and the user code Ch is stored in the usage-related information Ih, the comprehensive management unit Mt then references the authentication-related information Ic and checks this user code Ch against the authentication code Cc that are set for the user H with this user code Ch (#32). If the relationship information between the user code Ch and the authentication code Cc is stored in the authentication-related information Ic, unloading pertaining to the unloading request from the target block management unit Mb is permitted. That is to say, the comprehensive management unit Mt regards, as the unloading permission condition, a correct user code Ch and a correct authentication code Cc that correspond to the pallet P pertaining to the unloading request being output by the target block management unit Mb that has made this unloading request. For example, in the example shown in FIG. 6, the comprehensive management unit Mt references the usage-related information Ih, checks that the pallet code No. 299 of the pallet P pertaining to the unloading request belongs to the user H1 with the user code Ch1, and determines whether or not this user code Ch1 matches the user code Ch1 output by the target block management unit Mb that has made the unloading request. If it is determined that these user codes match, the comprehensive management unit Mt references the authentication-related information Ic, checks the authentication code Cc1 that is set for the user H1 with this user code Ch1, and determines whether or not this authentication code Cc1 matches the authentication code Cc1 output by the target block management unit Mb that has made the unloading request. The comprehensive management unit Mt permits the unloading only if all of these codes match.

If it is determined that the unloading permission condition is met, the comprehensive management unit Mt gives the storage area management unit Ms an unloading transport instruction to perform unloading transport for the pallet P for which the unloading request has been made (#33). When giving the unloading transport instruction, the comprehensive management unit Mt outputs the pallet code Cp of the pallet P pertaining to the unloading request to the storage area management unit Ms. For example, in the example shown in FIG. 6, the comprehensive management unit Mt that has received an unloading request for the pallet P with the pallet code No. 299 from the target block management unit Mb pertaining to the user H1 gives the storage area management unit Ms an unloading transport instruction to perform unloading transport for this pallet P with the pallet code No. 299.

The storage area management unit Ms that has received the unloading transport instruction from the comprehensive management unit Mt references the storage-related information Is, and searches for the storage section code Cs of the storage section 10A in which the pallet P pertaining to the unloading transport instruction is stored (#34). For example, in the example shown in FIG. 6, the storage area management unit Ms that has received an unloading transport instruction for the pallet P with the pallet code No. 299 from the comprehensive management unit MT references the storage-related information Is, and searches for the storage section code Cs of the storage section 10A in which this pallet P is stored. In the example shown in FIG. 6, the pallet P with the pallet code No. 299 is stored in a storage section 10A with the storage section code No. 1.

The storage area management unit Ms that has searched, based on the storage-related information Is, for the storage section code Cs of the storage section 10A in which the pallet P pertaining to the unloading transport instruction is stored causes the transport device 11 (see FIG. 2) to perform unloading transport to take out the pallet P from the storage section 10A with this storage section code Cs (#35). For example, in the example shown in FIG. 6, the storage area management unit Ms causes the transport device 11 to perform unloading transport to take out the pallet P (the pallet P with the pallet code No. 299) for which the unloading transport instruction has been given, from the storage section 10A with the storage section code No. 1.

Shared Reception Area Management Unit

Figure 8:
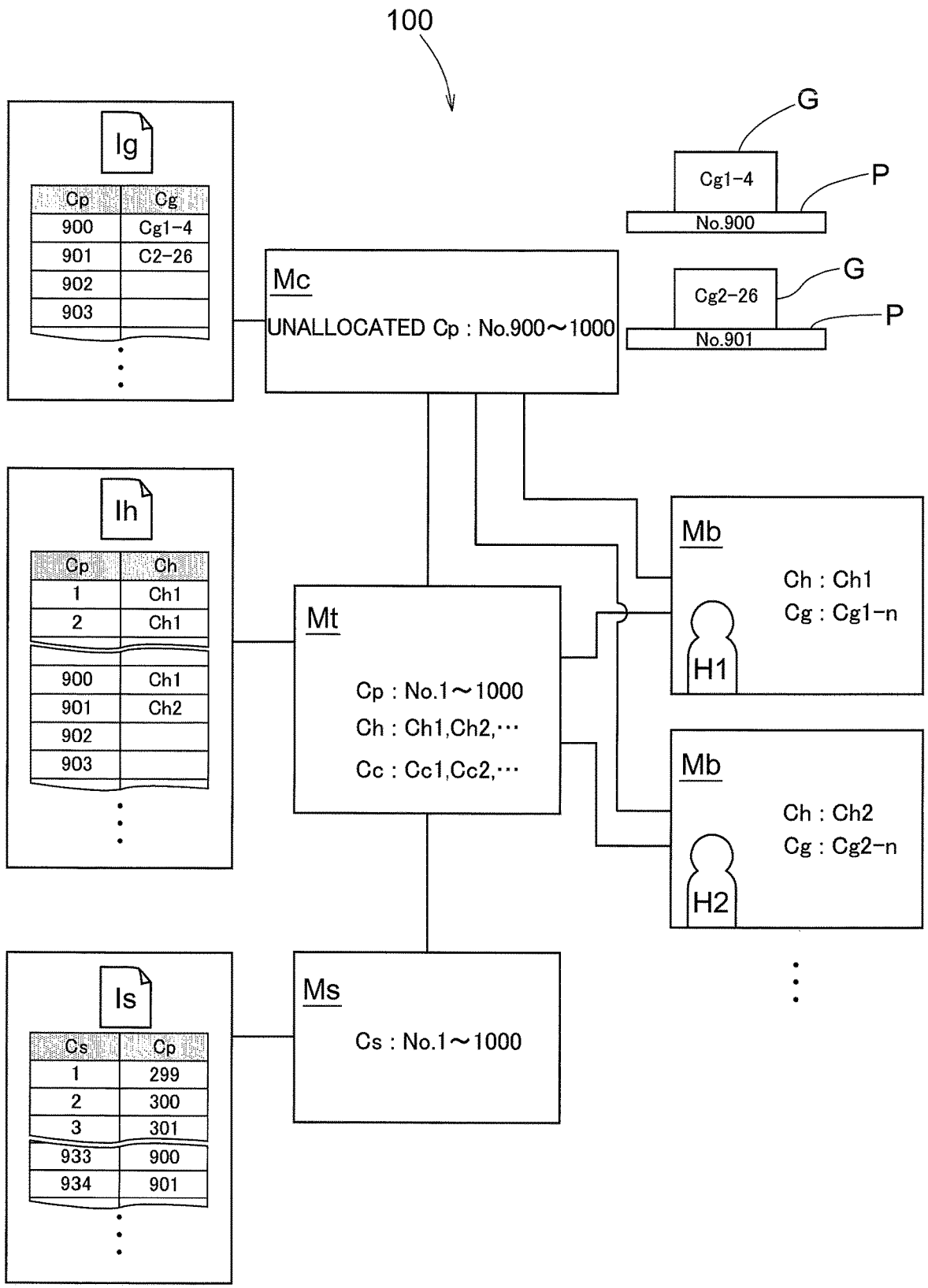
FIG. 8 is an explanatory diagram showing a system configuration for receiving articles in a shared reception area.

As shown in FIG. 8, in the present embodiment, the warehouse facility 100 includes a shared reception area management unit Mc for managing arrival reception in the shared reception area CA (see FIG. 3). In the present embodiment, the shared reception area management unit Mc manages unallocated pallets Py (pallet codes Cp) that are not allocated to any of the plurality of users H. In the example shown in FIG. 8, 101 pallets P with the pallet codes No. 900 to 1000, of 1000 pallets P with the pallet codes No. 1 to 1000 provided in the warehouse facility 100, are unallocated pallets Py that are not allocated to any of the plurality of users H.

In the present embodiment, when an article G arrives from the outside of the facility, the shared reception area management unit Mc selects a pallet P for placing the article G thereon from the plurality of unallocated pallets Py, and allocates the pallet code Cp of the selected pallet P to this article G. In the shared reception area CA, an operation (arrival reception operation) to place the article G on the pallet P with the pallet code Cp allocated to the arriving article G is performed. For example, in FIG. 8, an arriving article G with the article code Cg1-4 is received, and a pallet P with the pallet code No. 900 is allocated to this article G. Also, an arriving article G with the article code Cg2-26 is received, and a pallet P with the pallet code No. 901 is allocated to this article G. Each article G is placed on a pallet P with the pallet code Cp allocated to the article G through the arrival reception operation. In the present embodiment, arrival reception processing performed by the shared reception area management unit Mc does not involve any of the plurality of work block management units Mb.

In the present embodiment, the shared reception area management unit Mc manages arrival-related information Ig that is obtained by storing the relationship between the article code Cg that is set for an article G received through arrival reception and the pallet code Cp that is set for the pallet P on which this article G is placed. Thus, it is possible to manage the pallet code Cp of the pallet P on which the arriving article G received by the shared reception area management unit Mc is placed. In the example shown in FIG. 8, the relationship in which a pallet P with the pallet code No. 900 is allocated to an article G with the article code Cg1-4 is stored in the arrival-related information Ig. Also, the relationship in which a pallet P with the pallet code No. 901 is allocated to an article G with the article code Cg2-26 is stored in the arrival-related information Ig.

In the present embodiment, the shared reception area management unit Mc makes a loading request to load a pallet P, on which an arriving article G received is placed, to the comprehensive management unit Mt. When making the loading request, the shared reception area management unit Mc designates the pallet code Cp pertaining to the loading request.

When the loading request is made from the shared reception area management unit Mc, the comprehensive management unit Mt gives the storage area management unit Ms a loading transport instruction to perform loading transport for a pallet to be loaded Pt, which is the pallet P for which the loading request has been made.

When the loading transport instruction is given from the comprehensive management unit Mt, the storage area management unit Ms causes the transport device 11 to perform loading transport to load the pallet P pertaining to the loading transport instruction. The storage area management unit Ms then stores, as the storage-related information Is, the relationship between the pallet code Cp of the pallet P pertaining to the loading transport instruction and the storage section code Cs of the storage section 10A in which this pallet P is stored.

In the present embodiment, arrival reception processing performed by the shared reception area management unit Mc does not involve any of the plurality of work block management units Mb, as mentioned above. In the present embodiment, the shared reception area management unit Mc outputs the article code Cg of an article G placed on a loaded pallet Pa, which is the pallet to be loaded Pt that has been loaded into the storage section 10A, and the pallet code Cp of this loaded pallet Pa, to the work block management unit Mb of the user H who handles the article G placed on the loaded pallet Pa. Thus, if the arriving article G received by the shared reception area management unit Mc is an article G to be managed by the work block management unit Mb, the work block management unit Mb can later perceive the pallet code Cp of the pallet P on which this article G is placed.

In the present embodiment, the work block management unit Mb that has acquired the pallet code Cp of the loaded pallet Pa from the shared reception area management unit Mc outputs this pallet code Cp and the user code Ch corresponding to the work block management unit Mb to the comprehensive management unit Mt. The comprehensive management unit Mt then stores, as the usage-related information Ih, the relationship between the pallet code Cp acquired from the work block management unit Mb and the user code Ch.

Shared Reception Processing

Figure 9:
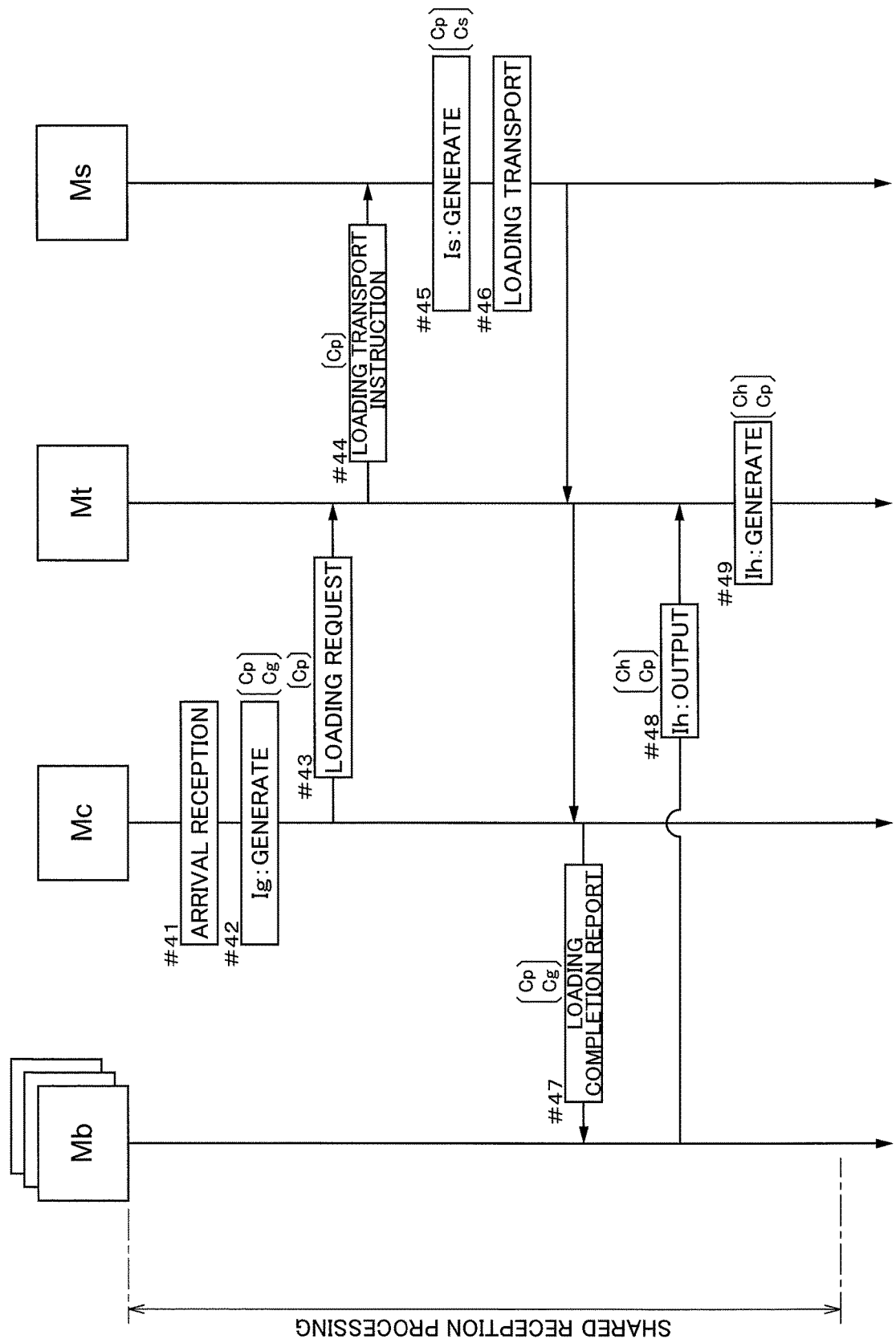
FIG. 9 is a flowchart showing a procedure for performing shared reception processing.

Next, shared reception processing performed by the warehouse facility 100 will be described with reference to the flowchart in FIG. 9.

In the shared reception processing, the shared reception area management unit Mc receives an article G arriving from the outside of the facility (#41), and generates the arrival-related information Ig that is obtained by storing the relationship between the article code Cg of the arriving article G received and the pallet code Cp of the pallet P on which this article G is placed (#42). For example, in the example shown in FIG. 8, the shared reception area management unit Mc receives an arriving article G with the article code Cg1-4, and places this article G on a pallet P with the pallet code No. 900. The shared reception area management unit Mc then generates the arrival-related information Ig indicating that the article G with the article code Cg1-4 is placed on the pallet P with the pallet code No. 900.

After generating the arrival-related information Ig, the shared reception area management unit Mc makes a loading request to the comprehensive management unit Mt (#43). When making the loading request, the shared reception area management unit Mc outputs the pallet code Cp of the pallet P pertaining to the loading request to the comprehensive management unit Mt. For example, in the example shown in FIG. 8, the shared reception area management unit Mc outputs, to the comprehensive management unit Mt the pallet code No. 900 of the pallet P on which the article G with the article code Cg1-4 is placed.

The comprehensive management unit Mt that has received the loading request from the shared reception area management unit Mc gives the storage area management unit Ms a loading transport instruction to perform loading transport for the pallet P for which the loading request has been made (#44). When giving the loading transport instruction, the comprehensive management unit Mt outputs the pallet code Cp of the pallet P pertaining to the loading request to the storage area management unit Ms. For example, in the example shown in FIG. 8, the comprehensive management unit Mt that has received a loading request for a pallet P with the pallet code No. 900 from the shared reception area management unit Mc gives the storage area management unit Ms a loading transport instruction to perform loading transport for this pallet P with the pallet code No. 900.

The storage area management unit Ms that has received the loading transport instruction from the comprehensive management unit Mt generates the storage-related information Is that is obtained by storing the relationship between the pallet code Cp of the pallet P pertaining to this loading transport instruction and the storage section code Cs of the storage section 10A that is a loading destination to which the pallet P is to be loaded (#45). The storage area management unit Ms then manages the storage-related information Is that is obtained by storing the relationship between the pallet code Cp of the pallet P and the storage section code Cs of the storage section 10A in which this pallet P is stored. For example, in the example shown in FIG. 8, the storage area management unit Ms that has received a loading transport instruction for a pallet P with the pallet code No. 900 from the comprehensive management unit Mt generates the storage-related information Is that is obtained by storing the relationship between the pallet code No. 900 of this pallet P and the storage section code No. 933 of the storage section 10A that is the loading destination to which this pallet P is to be loaded.

The storage area management unit Ms that has generated the storage-related information Is causes the transport device 11 (see FIG. 2) to perform loading transport to transport, to the storage section 10A, the pallet P for which the loading transport instruction has been given, based on the generated storage-related information Is (#46). For example, in the example shown in FIG. 8, the storage area management unit Ms causes the transport device 11 to perform loading transport to transport to the pallet P (the pallet P with the pallet code No. 900) for which the loading transport instruction has been given, to the storage section 10A with the storage section code No. 933.

After completing the loading, the storage area management unit Ms makes a loading completion report to the comprehensive management unit Mt, and the comprehensive management unit Mt that has received the loading completion report makes a loading completion report to the shared reception area management unit Mc. The shared reception area management unit Mc then makes a loading completion report to the work block management unit Mb of the user H who handles the article G placed on the loaded pallet Pa, which is the pallet to be loaded Pt that has been loaded into the storage section 10A (#47). When making the loading completion report to the work block management unit Mb, the shared reception area management unit Mc outputs, to this work block management unit Mb, the article code Cg of the article G placed on the loaded pallet Pa and the pallet code Cp of this loaded pallet Pa. For example, in the example shown in FIG. 8, the shared reception area management unit Mc outputs the article code Cg1-4 of the article G placed on the loaded pallet Pa and the pallet code No. 900 of this loaded pallet Pa to the work block management unit Mb pertaining to the user H1.

The work block management unit Mb that has received the loading completion report from the shared reception area management unit Mc outputs, to the comprehensive management unit Mt, the pallet code Cp of the loaded pallet Pa and the user code Ch1 of the user H1 pertaining to the work block management unit Mb (#48). The comprehensive management unit Mt then generates the usage-related information Ih that is obtained by storing the relationship between the pallet code Cp output by the work block management unit Mb and the user code Ch (#49). For example, in the example shown in FIG. 8, after receiving the loading completion report from the shared reception area management unit Mc, the work block management unit Mb pertaining to the user H1 outputs the pallet code No. 900 of the loaded pallet Pa and the user code Ch1 of this user H1 to the comprehensive management unit Mt. The comprehensive management unit Mt then generates the usage-related information Ih indicating that the loaded pallet Pa with the pallet code No. 900 belongs to the user H1 with the user code Ch1.

Other Embodiments

Next, other embodiments of the warehouse facility will be described.

(1) The above embodiment has described an example in which, if an unloading request is made from the target block management unit Mb, the comprehensive management unit Mt also regards, as the unloading permission condition, the relationship between the authentication code Cc output from the target block management unit Mb and the user code Ch of the user H being stored in the authentication-related information Ic. However, the present invention is not limited to this example, and the relationship between the authentication code Cc and the user code Ch being stored in the authentication-related information Ic need not be regarded as the unloading permission condition. For example, the relationship between the pallet code Cp designated in the unloading request and the user code Ch of the target user H being stored in the usage-related information Ih may solely be regarded as the unloading permission condition.

(2) The above embodiment has described an example in which the storage area management unit Ms manages the storage-related information Is that is obtained by storing the relationship between the pallet code Cp of a pallet P and the storage section code Cs of a storage section 10A in which this pallet P is stored. However, the present invention is not limited to this example, and the comprehensive management unit Mt may alternatively manage the storage-related information Is.

(3) The above embodiment has described an example in which the storage area SA includes the main storage regions SA1 for storing the allocated pallets Pf and the sub-storage region SA2 for storing the unallocated pallets Py. However, the present invention is not limited to this example, and the storage area SA need not include the sub-storage region SA2. In this case, the unallocated pallets Py may be transported from the outside of the facility to the warehouse facility 100 when necessary. Although in the above embodiment, the boundary between the main storage regions SA1 and the sub-storage region SA2 is clear in the storage area SA, a configuration may alternatively be employed in which no such boundary is provided and sub-storage regions SA2 are distributed in the main storage regions SA1. Alternatively, the main storage regions SA1 and the sub-storage region SA2 may be changed from time to time depending on the state of use of the pallets P.

(4) The above embodiment has described an example in which the warehouse facility 100 includes the shared reception area CA. However, the present invention is not limited to this example, and the warehouse facility 100 need not include the shared reception area CA. Although the above embodiment has described, as an example, a configuration in which the warehouse facility 100 includes both the individual reception areas IA provided in the respective work blocks B and the shared reception area CA, the present invention is not limited thereto. For example, the warehouse facility 100 may alternatively be configured to not include the individual reception areas IA but only include the shared reception area CA.

(5) The above embodiment has described an example in which, when making a loading request, the target block management unit Mb outputs the pallet code Cp of the pallet P pertaining to the loading request to the comprehensive management unit Mt. However, the target block management unit Mb may also output, to the comprehensive management unit Mt, the article code Cg of an article G placed on a pallet P pertaining to the loading request, in addition to the pallet code Cp of the pallet P. In this case, it is preferable that the comprehensive management unit Mt manages information that is obtained by storing the relationship between the pallet code Cp and the article code Cg.

(6) The above embodiment has described an example in which the storage area SA includes one storage floor SF, and the work area WA includes a plurality of work floors WF that are arranged in a line in the vertical direction. However, the present invention is not limited to this example, and the number of floors that constitute the respective areas need only be one or more. Specifically, the storage area SA may alternatively include a plurality of storage floors SF that are arranged in a line in the vertical direction. The work area WA may alternatively be provided on only one work floor WF.

(7) The above embodiment has described an example in which the storage transport device 111 is configured as a stacker crane capable of moving a transfer portion in the vertical direction and the second direction Y. However, the present invention is not limited to this example. For example, the storage transport device 111 may alternatively be configured to include a traveling truck that travels in the second direction Y along rails provided on each of a plurality of shelves in the storage cabinet 10 and that can transfer the pallets P between the plurality of storage sections 10A arranged in a line in the second direction Y on each shelf.

(8) Note that the configuration disclosed in the above embodiment can also be applied in combination with configurations disclosed in the other embodiments unless inconsistency occurs. Regarding the other configurations as well, the embodiments disclosed in the present specification are merely examples in all respects. Accordingly, various modifications can be made as appropriate without departing from the gist of the present disclosure.

Summary of the Above Embodiment

The above-described warehouse facility will be described below.

A warehouse facility according to the present disclosure includes:

a storage area including a plurality of storage sections for storing a transporting tool for placing an article thereon or putting an article therein when the article is transported;

a work area including a plurality of work blocks to each of which a user is allocated, in which a loading operation and an unloading operation for the transporting tool allocated to each user from and to the storage area are performed;

a storage area management unit for managing the storage area;

a work block management unit for managing an operational state including a state of the loading operation and the unloading operation, in each of the plurality of work blocks; and a comprehensive management unit for managing a tool code that is set for each of a plurality of the transporting tools and a user code that is set for each of a plurality of the users, and managing usage-related information that is obtained by storing a relationship between the tool code of each of the plurality of transporting tools stored in the storage area and the user code of the user to which each of the transporting tools is allocated, the storage area is provided with a transport device for performing loading transport to transport the transporting tool to the storage sections, and unloading transport to transport the transporting tool from the storage sections, the storage area management unit causes the transport device to perform the loading transport or the unloading transport based on an instruction from the comprehensive management unit, assuming that a target work block of the plurality of work blocks is a target block, a user who uses the target block is a target user, and the work block management unit that manages the operational state in the target block is a target block management unit, the target block management unit designates the tool code and makes an unloading request to unload the transporting tool from the storage area to the comprehensive management unit, and if the unloading request is made from the target block management unit, the comprehensive management unit gives the storage area management unit an unloading transport instruction to perform the unloading transport for the transporting tool for which the unloading request has been made, under an unloading permission condition that a relationship between the tool code designated in the unloading request and the user code of the target user is stored in the usage-related information.

According to this configuration, the tool code is set for each of the plurality of transporting tools, and the user code is set for each of the plurality of users. The transporting tool to be used by each user is allocated to each of the plurality of users. The comprehensive management unit manages the usage-related information that is obtained by storing the relationship between the tool code of each of the plurality of transporting tools stored in the storage area and the user code of the user to which each transporting tool is allocated. Thus, the users to which the transporting tools stored in the storage area are allocated can be appropriately managed. To unload a transporting tool in accordance with the unloading request for the transporting tool from the target block management unit, unloading permission given by the comprehensive management unit is required. If the unloading request for a transporting tool is made from the target block management unit, the comprehensive management unit permits the unloading of the transporting tool under the unloading permission condition that the relationship between the tool code designated in the unloading request and the user code of the user pertaining to the target block management unit is stored in the usage-related information. It is thus possible to reduce the likelihood that the user who makes the unloading request for the transporting tool incorrectly unloads a transporting tool allocated to another user. Accordingly, according to this configuration, in the warehouse facility for transporting and storing the transporting tools for placing articles thereon or putting articles therein when the articles are transported, the transporting tools handled by the respective users can be appropriately managed.

Here, it is preferable that the comprehensive management unit manages an authentication code that is set for each of the plurality of users, in addition to the tool code and the user code, and manages authentication-related information that is obtained by storing a relationship between the user code of each of the plurality of users and the authentication code of each of the users, when making the unloading request, the target block management unit outputs the authentication code to the comprehensive management unit, and if the unloading request is made from the target block management unit, the comprehensive management unit also regards, as the unloading permission condition, a relationship between the authentication code output from the target block management unit and the user code of the target user being stored in the authentication-related information.

According to this configuration, it can be regarded that an additional condition for permitting the unloading is that the authentication code that is output by the target block management unit that has made the unloading request is the authentication code that is set for the user pertaining to the target block management unit. For a user to unload a transporting tool, the fact that the transporting tool is allocated to the user needs to be stored as the relationship between the tool code and the user code in the usage-related information, and furthermore, the relationship between the user code that is set for the user and the authentication code also needs to be correctly stored in the authentication-related information. Accordingly, even if a user code of a user is incorrectly used by another user, the transporting tool allocated to the user is not unloaded by the other user unless the authentication code is correct. Therefore, it is possible to further reduce the likelihood that the user who makes an unloading request for a transporting tool incorrectly unloads a transporting tool allocated to another user. Accordingly, according to this configuration, the transporting tools handled by the plurality of users can be managed more appropriately.

It is preferable that the storage area management unit manages a storage section code that is set for each of the plurality of storage sections, and manages storage-related information that is obtained by storing the tool code of the transporting tool and the storage section code of a storage section in which the transporting tool is stored.

According to this configuration, the tool code of the transporting tool stored in each of the plurality of storage sections can be readily perceived, and thus, the use of the user to which the transporting tool stored in each of the plurality of storage sections pertains can be appropriately managed.

It is preferable that, assuming that the transporting tool allocated to a user is an allocated tool, and the transporting tool that is not allocated to a user is an unallocated tool, the tool code is set for both the allocated tool and the unallocated tool, and the storage area includes a main storage region for storing the allocated tool, and a sub-storage region for storing the unallocated tool.

According to this configuration, the unallocated tool can also be stored in the storage area. Accordingly, when each user wants to increase or decrease the number of transporting tools that they use, the number of allocated tools can be promptly increased or decreased. Note that since the unallocated tool is not allocated to any user, an article of any user is not placed thereon or put therein. Therefore, it is preferable that in the sub-storage region for storing the unallocated tool, a plurality of transporting tools is collectively stored in one storage section by stacking these transporting tools, for example. Thus, the storage area can be used more effectively.

It is preferable that the warehouse facility further includes:

a shared reception area that is an area shared by the plurality of users, and in which the article handled by each of the plurality of users that has arrived from outside of the facility is received; and a shared reception area management unit for managing arrival reception in the shared reception area, wherein the arrival reception includes an operation to place the article on the transporting tool or to put the article in the transporting tool, the shared reception area management unit manages arrival-related information that is obtained by storing a relationship between the article code that is set for the article received through the arrival reception, and the tool code that is set for the transporting tool on which the article is placed, and makes a loading request to load the transporting tool on which the article is placed to the comprehensive management unit, if the loading request is made from the shared reception area management unit, the comprehensive management unit gives the storage area management unit a loading transport instruction to perform the loading transport for a tool to be loaded that is the transporting tool for which the loading request has been made, the shared reception area management unit outputs the article code of the article that is placed on or put in a loaded tool that is the tool to be loaded that has been loaded into one of the storage sections and the tool code of the loaded tool, to the work block management unit of the user who handles the article placed on the loaded tool, the work block management unit that has acquired the tool code of the loaded tool from the shared reception area management unit outputs the tool code and the user code corresponding to the work block management unit to the comprehensive management unit, and the comprehensive management unit stores, as the usage-related information, a relationship between the tool code acquired from the work block management unit and the user code.

According to this configuration, an article arriving from the outside of the facility can be received in the shared reception area that is shared by a plurality of the users. Since such arrival reception does not involve the work block management unit in each work block, the time to load an article to a storage section can be shortened, and the article can be efficiently loaded. After an article has been loaded into a storage section, information regarding the transporting tool on which the article has been placed or in which the article has been put is later output from the shared reception area management unit to the work block management unit of the user who handles this article, and is later output from the work block management unit to the comprehensive management unit. Thus, the article loaded into the storage section can be appropriately managed together with the transporting tool.

It is preferable that the shared reception area is provided in a location other than an individual reception area in which an article that has arrived from the outside of the facility is received, the individual reception area being in each of the plurality of work blocks.

According to this configuration, if the individual reception area provided in each work block is in a busy state, or if the individual reception area does not function, e.g., during nighttime, an arriving article can be received in the shared reception area. Accordingly, an arriving article can be efficiently received without stop regardless of the situation of the individual reception area.

INDUSTRIAL APPLICABILITY

The technology according to the present disclosure can be used in a warehouse facility that includes a storage area that includes a plurality storage sections, and a work area in which a loading operation and an unloading operation for the storage area is performed.

DESCRIPTION OF REFERENCE SIGNS

100: Warehouse facility
10A: Storage section
11: Transport device
WA: Work area
B: Work block (target block)
IA: Individual reception area
CA: Shared reception area
SA: Storage area
SA1: Main storage region
SA2: Sub-storage region
Mt: Comprehensive management unit
Mb: Work block management unit (target block management unit)
Ms: Storage area management unit
Mc: Shared reception area management unit
Cc: Authentication code
Cg: Article code
Ch: User code
Cp: Pallet code (tool code)
Cs: Storage section code
Ic: Authentication-related information
Ig: Arrival-related information
Ih: Usage-related information
Is: Storage-related information
H: User (target user)
P: Pallet (transporting tool)
G: Article

What is claimed is:

1. A warehouse facility comprising:
a storage area comprising a plurality of storage sections for storing a transporting tool for placing an article thereon or putting an article therein when the article is transported;
a work area comprising a plurality of work blocks to each of which a user is allocated, and in which a loading operation and an unloading operation for the transporting tool allocated to each user from and to the storage area is performed;
a storage area management unit for managing the storage area;
a work block management unit for managing an operational state including a state of the loading operation and the unloading operation in each of the plurality of work blocks; and
a comprehensive management unit for managing a tool code that is set for each of a plurality of the transporting tools and a user code that is set for each of a plurality of the users, and for managing usage-related information that is obtained by storing a relationship between the tool code of each of the plurality of transporting tools stored in the storage area and the user code of the user to which each of the transporting tools is allocated,
wherein:
the storage area is provided with a transport device for performing loading transport to transport the transporting tool to the storage sections, and for unloading transport to transport the transporting tool from the storage sections,
the storage area management unit causes the transport device to perform the loading transport or the unloading transport based on an instruction from the comprehensive management unit, assuming that a target work block of the plurality of work blocks is a target block, a user who uses the target block is a target user, and the work block management unit that manages the operational state in the target block is a target block management unit,
the target block management unit designates the tool code and makes an unloading request to unload the transporting tool from the storage area to the comprehensive management unit, and
if the unloading request is made from the target block management unit, the comprehensive management unit gives the storage area management unit an unloading transport instruction to perform the unloading transport for the transporting tool for which the unloading request has been made under an unloading permission condition that a relationship between the tool code designated in the unloading request and the user code of the target user is stored in the usage-related information.

2. The warehouse facility according to claim 1, wherein:
the comprehensive management unit manages an authentication code that is set for each of the plurality of users, in addition to the tool code and the user code, and manages authentication-related information that is obtained by storing a relationship between the user code of each of the plurality of users and the authentication code of each of the users,
when making the unloading request, the target block management unit outputs the authentication code to the comprehensive management unit, and
if the unloading request is made from the target block management unit, the comprehensive management unit also regards, as the unloading permission condition, a relationship between the authentication code output from the target block management unit and the user code of the target user as stored in the authentication-related information.

3. The warehouse facility according to claim 1,
wherein the storage area management unit manages a storage section code that is set for each of the plurality of storage sections, and manages storage-related information that is obtained by storing the tool code of the transporting tool and the storage section code of a storage section in which the transporting tool is stored.

4. The warehouse facility according to claim 1,
wherein, assuming that the transporting tool allocated to a user is an allocated tool, and the transporting tool that is not allocated to a user is an unallocated tool, the tool code is set for both the allocated tool and the unallocated tool, and
wherein the storage area includes a main storage region for storing the allocated tool, and a sub-storage region for storing the unallocated tool.

5. The warehouse facility according to claim 1, further comprising:
a shared reception area that is an area shared by the plurality of users, and in which the article handled by each of the plurality of users that has arrived from outside of the facility is received; and
a shared reception area management unit for managing arrival reception in the shared reception area,
wherein:
the arrival reception includes an operation to place the article on the transporting tool or to put the article in the transporting tool,
the shared reception area management unit manages arrival-related information that is obtained by storing a relationship between the article code that is set for the article received through the arrival reception, and the tool code that is set for the transporting tool on which the article is placed, and makes a loading request to load the transporting tool on which the article is placed to the comprehensive management unit,
if the loading request is made from the shared reception area management unit, the comprehensive management unit gives the storage area management unit a loading transport instruction to perform the loading transport for a tool to be loaded that is the transporting tool for which the loading request has been made,
the shared reception area management unit outputs the article code of the article that is placed on or put in a loaded tool that is the tool to be loaded that has been loaded into one of the storage sections and the tool code of the loaded tool, to the work block management unit of the user who handles the article placed on the loaded tool,
the work block management unit that has acquired the tool code of the loaded tool from the shared reception area management unit outputs the tool code and the user code corresponding to the work block management unit to the comprehensive management unit, and
the comprehensive management unit stores, as the usage-related information, a relationship between the tool code acquired from the work block management unit and the user code.

6. The warehouse facility according to claim 5,
wherein the shared reception area is provided in a location other than an individual reception area in which an article that has arrived from the outside of the facility is received, and the individual reception area is in each of the plurality of work blocks.

* * * * *